(12) United States Patent
Wolfson

(10) Patent No.: US 11,604,005 B1
(45) Date of Patent: Mar. 14, 2023

(54) IN-LINE DEVICE FOR CONTROLLING VENTILATION SYSTEM

(71) Applicant: Tuckernuck Technology, L.L.C., Duxbury, MA (US)

(72) Inventor: Jason Wolfson, Marshfield, MA (US)

(73) Assignee: Tuckernuck Technology, L.L.C., Duxbury, MA (US)

( * ) Notice: Subject to any disclaimer, the term of this patent is extended or adjusted under 35 U.S.C. 154(b) by 0 days.

(21) Appl. No.: 17/685,707

(22) Filed: Mar. 3, 2022

(51) Int. Cl.
| | |
|---|---|
| *G05B 19/042* | (2006.01) |
| *F24F 11/88* | (2018.01) |
| *F24F 11/56* | (2018.01) |
| *H02J 13/00* | (2006.01) |
| *F24F 110/30* | (2018.01) |
| *F24F 110/10* | (2018.01) |
| *F24F 110/50* | (2018.01) |
| *F24F 140/60* | (2018.01) |
| *F24F 110/20* | (2018.01) |

(52) U.S. Cl.
CPC .............. *F24F 11/88* (2018.01); *F24F 11/56* (2018.01); *G05B 19/042* (2013.01); *H02J 13/0005* (2020.01); *F24F 2110/10* (2018.01); *F24F 2110/20* (2018.01); *F24F 2110/30* (2018.01); *F24F 2110/50* (2018.01); *F24F 2140/60* (2018.01); *G05B 2219/2614* (2013.01)

(58) Field of Classification Search
None
See application file for complete search history.

(56) References Cited

U.S. PATENT DOCUMENTS

| | | | |
|---|---|---|---|
| 7,258,280 B2 * | 8/2007 | Wolfson | F24F 11/0001 165/244 |
| 8,639,391 B1 * | 1/2014 | Alberth, Jr. | G05B 15/02 340/657 |
| 9,281,687 B2 * | 3/2016 | Holder | H01R 13/6683 |
| 9,500,382 B2 * | 11/2016 | Grabinger | F24F 11/0008 |
| 9,519,297 B1 * | 12/2016 | Virskus | F24F 11/30 |
| 9,841,208 B2 | 12/2017 | Salerno | |
| 9,909,771 B2 | 3/2018 | Wolgamott et al. | |
| 10,317,923 B2 * | 6/2019 | Karc | G05F 1/66 |
| 10,488,070 B1 | 11/2019 | Wolfson | |
| 2004/0158359 A1 * | 8/2004 | Frecska | G05B 15/02 700/276 |

(Continued)

FOREIGN PATENT DOCUMENTS

| | | | | |
|---|---|---|---|---|
| CN | 109405151 A | * | 3/2019 | |
| CN | 110779109 A | * | 10/2019 | F24F 11/74 |

(Continued)

*Primary Examiner* — Jason Lin
(74) *Attorney, Agent, or Firm* — Fish & Richardson P.C.

(57) ABSTRACT

An in-line device for controlling a ventilation system for an enclosed space is featured. The ventilation system is configured to produce a first airflow from an external environment to the enclosed space and a second airflow from the enclosed space to the external environment. The in-line device includes a first electrical interface configured to connect to an electrical outlet, a second electrical interface configured to receive a power plug for the ventilation system, and a controller configured to control the ventilation system based on a first parameter of the first airflow and a second parameter of the second airflow.

33 Claims, 10 Drawing Sheets

(56) References Cited

U.S. PATENT DOCUMENTS

| | | | |
|---|---|---|---|
| 2011/0264280 A1* | 10/2011 | Grabinger | F24F 7/00 700/282 |
| 2012/0052791 A1* | 3/2012 | Kurelowech | F24F 11/77 454/329 |
| 2012/0228393 A1* | 9/2012 | Storm | F24F 11/0008 236/44 A |
| 2013/0124111 A1* | 5/2013 | McKie | F24F 11/30 702/45 |
| 2014/0012543 A1* | 1/2014 | Son | G01M 99/005 702/185 |
| 2014/0159634 A1* | 6/2014 | Yokoyama | H05K 7/20836 318/471 |
| 2014/0262134 A1* | 9/2014 | Arensmeier | F24D 5/12 165/11.2 |
| 2015/0005900 A1* | 1/2015 | Steele | G05B 19/0426 700/19 |
| 2016/0116177 A1* | 4/2016 | Sikora | F24F 11/74 165/250 |
| 2018/0172304 A1 | 6/2018 | Wolfson | |
| 2018/0292098 A1* | 10/2018 | Bandyopadhyay | F24F 11/30 |
| 2019/0257538 A1* | 8/2019 | Ferrere | F24F 11/46 |
| 2020/0253029 A1* | 8/2020 | Fadell | G08B 17/00 |

FOREIGN PATENT DOCUMENTS

| | | | | |
|---|---|---|---|---|
| CN | 110410915 A | * | 11/2019 | |
| JP | 2001289125 A | * | 10/2001 | |
| KR | 100685767 B1 | * | 11/2005 | F24F 7/08 |
| KR | 20130118124 A | * | 4/2012 | F24F 11/62 |
| KR | 20140054477 | * | 5/2014 | |
| KR | 2019086076 A | * | 7/2019 | F04D 25/08 |
| WO | WO 2020146315 | | 7/2020 | |

* cited by examiner

IN-LINE DEVICE FOR CONTROLLING VENTILATION SYSTEM

TECHNICAL FIELD

This specification relates to an in-line device for controlling a ventilation system.

BACKGROUND

Ventilation systems can provide mechanical ventilation for an enclosed space, such as a room, a house, a building, or other enclosed space. Heat recovery ventilation (HRV) and energy recovery ventilation (ERV) systems are examples of such ventilation systems. HRV and ERV systems draw air from an external environment of the enclosed space and into an interior environment of the enclosed space and also vent air from the interior environment of the enclosed space into the external environment.

HRV and ERV systems can include cores that can recover energy used to cool or heat air in the interior environment. For example, when air is vented from the interior environment, the air vented from the interior environment may previously have been cooled or heated via operation of a heating or cooling system for the enclosed space. The cores of the HRV and ERV systems allow the air drawn in from the external environment to be cooled or heated by the vented air as the vented air is vented into the external environment. HRV and ERV systems differ in that ERV systems typically allow for moisture recovery while HRV systems do not allow for moisture recovery. Thus for ERV systems, at least some of the moisture in the vented air can be transferred to the drawn-in air to maintain indoor humidity levels.

SUMMARY

This disclosure features technology involving an in-line device for a ventilation system that has both inflow and outflow conduits, e.g., an HRV system or an ERV system, that would enable the ventilation system to be controlled based on information collected about a condition of an inflow (e.g., an airflow from an external environment into an enclosed space) and based on information collected about a condition of an outflow (e.g., an airflow out of the enclosed space into the external environment). Sensor systems can be used to monitor the condition of the inflow and the outflow of the ventilation system, and the in-line device can control the ventilation system based on this monitored condition.

Advantages of the technology described in this disclosure may include those described below and elsewhere in this disclosure. The technology described in this disclosure can allow for control a ventilation system based on a precise measurement of an interior condition of an enclosed space or a condition exterior of the enclosed space. In particular, the technology can be used to control the ventilation system based on sensor data collected by one or more sensor systems.

The technology described in this disclosure can involve in-line devices that could reduce the cost of installing for an enclosed space a ventilation system controlled using sensor data. The ventilation system used in connection with an in-line device described in this disclosure does not need complex sensing capabilities and thus can be relatively inexpensive compared to ventilation systems with integrated sensing capabilities. The in-line devices can be relatively inexpensive control devices that receive sensor data and that control the ventilation system, thereby allowing cheaper ventilation systems to be controlled using the sensor data. Furthermore, a user can retrofit conventional ventilation systems, e.g., conventional ERV and HRV systems, using the in-line devices such that the user does not need to replace a ventilation system to achieve a sensing-based control of the ventilation system For example, the in-line device can be electrically connected to a ventilation system that does not have sensing capabilities, such as an HRV system or ERV system as described in this disclosure. The in-line device can be used to enable control of such a ventilation system based on sensor data, even though the ventilation system itself does not have sensing capabilities. The in-line device can include one or more sensor ports that communicate with sensor systems that monitor parameters of the ventilation system, for example, parameters of an inflow or an outflow of the ventilation system.

The technology described in this disclosure can allow for improved modularity, as the in-line device can be simply connected to a power line of a ventilation system and can include ports for connecting to sensors. In this regard, the in-line device need not be limited to specific types of ventilation systems and or specific types of sensors. The in-line device can be compatible with many types of ventilation systems and many types of sensors. Furthermore, a sensor system for detecting a particular type of data can be easily exchanged with another sensor system for detecting another type of data, thus allowing the in-line device to be adaptable to the needs of a user of the ventilation system.

The technology described in this disclosure can allow for better-optimized control of ventilation systems and for informing a user of maintenance to be performed with respect to ventilation systems. Rather than a user having to manually operate a ventilation system in response to changing conditions in an external environment (e.g., extreme cold or extreme heat), an in-line device connected to the ventilation system can automatically operate the ventilation system based on sensor data collected by sensor system in communication with the in-line device. Furthermore, rather than a user having to manually inspect a ventilation system for potential maintenance needs, the in-line device can detect a maintenance need based on the sensor data. To provide an alert to a user of the maintenance need, the in-line device can alert the user via a mobile device used by the user.

In one aspect, an in-line device for controlling a ventilation system for an enclosed space is featured. The ventilation system is configured to produce a first airflow from an external environment to the enclosed space and a second airflow from the enclosed space to the external environment. The in-line device includes a first electrical interface configured to connect to an electrical outlet, a second electrical interface configured to receive a power plug for the ventilation system, a first sensor port configured to communicate with a first sensor system for detecting a first parameter of the first airflow from the external environment to the enclosed space, a second sensor port configured to communicate with a second sensor system for detecting a second parameter of the second airflow from the enclosed space to the external environment, and a controller connected to the first sensor port and the second sensor port, the controller configured to control the ventilation system based on the detected first parameter of the first airflow and the second parameter of the second airflow.

In another aspect, a control system for controlling a ventilation system for an enclosed space is featured. The ventilation system is configured to produce a first airflow from an external environment to the enclosed space and a second airflow from the enclosed space to the external environment. The control system includes a first sensor system for detecting a first parameter of the first airflow from the external environment to the enclosed space, a second sensor system for detecting a second parameter of the second airflow from the enclosed space to the external environment, and an in-line device configured to connect to an electrical outlet and configured to receive a power plug for the ventilation system. The in-line device includes a first sensor port configured to communicate with the first sensor system, a second sensor port configured to communicate with the second sensor system, and a controller connected to the first sensor port and the second sensor port, the controller configured to control the ventilation system based on the detected first parameter and the detected second parameter.

In another aspect, a method of controlling a ventilation system for an enclosed space is featured. The ventilation system is configured to produce a first airflow from an external environment into the enclosed space and a second airflow from the enclosed space to the external environment. The method includes receiving, by an in-line device electrically connecting the ventilation system to an electrical outlet, data indicative of a first parameter of the first airflow from the external environment to the enclosed space and data indicative of a second parameter of the second airflow from the enclosed space to the external environment, and controlling, by the in-line device, the ventilation system based on the data indicative of the first parameter and the data indicative of the second parameter.

In another aspect, a system comprising one or more processing devices and one or more computer-readable non-transitory media. The one or more computer-readable non-transitory media store instructions that are executable by the processing device and upon execution cause the processing device to perform operations or a method of controlling a ventilation system for an enclosed space is featured. The ventilation system is configured to produce a first airflow from an external environment into the enclosed space and a second airflow from the enclosed space to the external environment. The operations or method include receiving, by an in-line device electrically connecting the ventilation system to an electrical outlet, data indicative of a first parameter of the first airflow from the external environment to the enclosed space and data indicative of a second parameter of the second airflow from the enclosed space to the external environment, and controlling, by the in-line device, the ventilation system based on the data indicative of the first parameter and the data indicative of the second parameter.

Implementations of any of the foregoing can include one or more of the following features.

In some implementations, the controller is configured to control the ventilation system based on the detected first relative humidity and the detected second relative humidity.

In some implementations, the first parameter is a first temperature of the first airflow, and the second parameter is a second temperature of the second airflow.

In some implementations, the first sensor system is configured to detect a first flow rate of the first airflow, the second sensor system is configured to detect a second flow rate of the second airflow, and the controller is configured to detect that a core of the ventilation system is clogged based on the detected first flow rate and the detected second flow rate. In some implementations, the controller is configured to detect that the core of the ventilation system is clogged by determining that at least one of the detected first flow rate or the detected second flow rate being no more than a threshold flow rate. In some implementations, the controller is configured to provide a user alert in response to detecting that the core of the ventilation system is clogged.

In some implementations, the first parameter is a first flow rate of the first airflow, and the second parameter is a second flow rate of the second airflow. In some implementations, the in-line device further includes a wireless transceiver configured to receive data from a remote sensor system for detecting an air quality in the external environment. The controller can be configured to operate the ventilation system in response to detecting the air quality. In some implementations, the controller is configured to operate the ventilation system in response to detecting the air quality by deactivating the ventilation system in response to the detected air quality being no less than a threshold air quality.

In some implementations, the in-line device further includes a wireless transceiver configured to receive data from a remote sensor system for detecting an air quality in the enclosed space. The controller can be configured to operate the ventilation system in response to detecting the air quality. In some implementations, the controller is configured to operate the ventilation system in response to detecting the air quality by activating the ventilation system in response to the detected air quality being no less than a threshold air quality.

In some implementations, the in-line device further includes a wireless transceiver configured to receive data from a remote sensor system for detecting an occupant in the enclosed space. The controller can be configured to operate the ventilation system in response to detecting the occupant in the enclosed space.

In some implementations, the controller is configured to control the ventilation system based on the detected first parameter of the first airflow and the detected second parameter of the second airflow by controlling a power delivered to the ventilation system.

In some implementations, the in-line device is an in-wall device that is mounted to the electrical outlet.

In some implementations, the in-line device further includes a housing for the first electrical interface, the second electrical interface, the first sensor port, the second sensor port, and the controller.

In some implementations, the housing is supported on a wall when the first electrical interface is connected to the electrical outlet.

In some implementations, the first sensor port is configured to wirelessly communicate with the first sensor system, and the second sensor port is configured to wireless communicate with the second sensor system.

In some implementations, the in-line device further includes a sensor to measure an amount of energy consumed by the ventilation system, wherein the controller is configured to provide information to a user computing device to cause the user computing device to present a visual representation of the amount of energy consumed by the ventilation system.

In some implementations, the first sensor system is configured to detect a first flow rate of the first airflow, the second sensor system is configured to detect a second flow rate of the second airflow, and the controller of the in-line device is configured to detect that a core of the ventilation system is clogged based on the detected first flow rate and the detected second flow rate.

In some implementations, the method, operations of the controller, or operations of the in-line device include receiving, by the in-line device, data indicative of a first flow rate of the first airflow and data indicative of a second flow rate of the second airflow, and detecting, by the in-line device, that a core of the ventilation system is clogged based on the data indicative of the first flow rate and the data indicative of the second flow rate.

In some implementations, the method, operations of the controller, or operations of the in-line device include wirelessly receiving, by the in-line device, data from a remote sensor system for detecting an air quality in the external environment, and operating, by the in-line device, the ventilation system in response to detecting the air quality.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
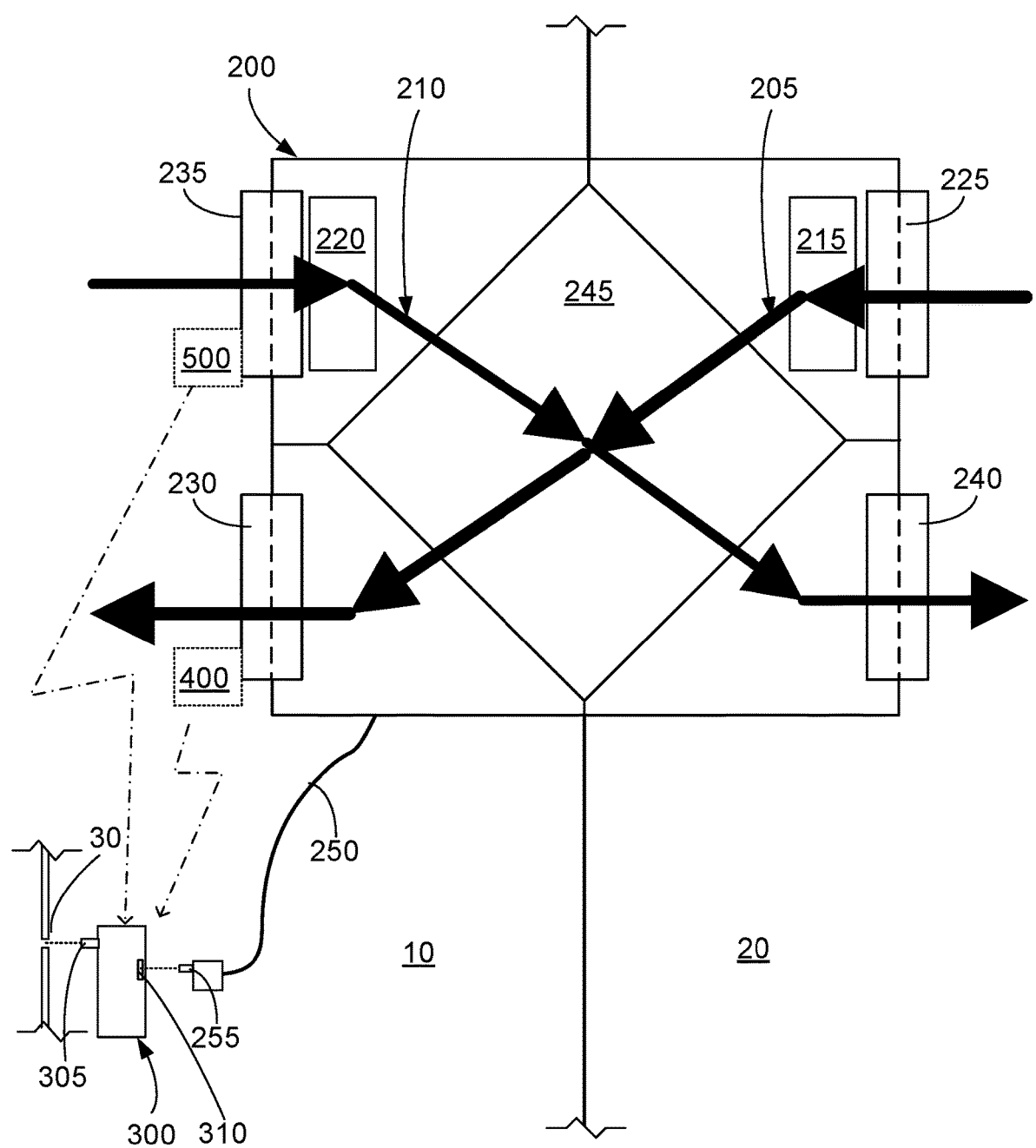
FIG. 1 is a schematic diagram of an example of a control system for controlling a ventilation system.
Figure 2A:
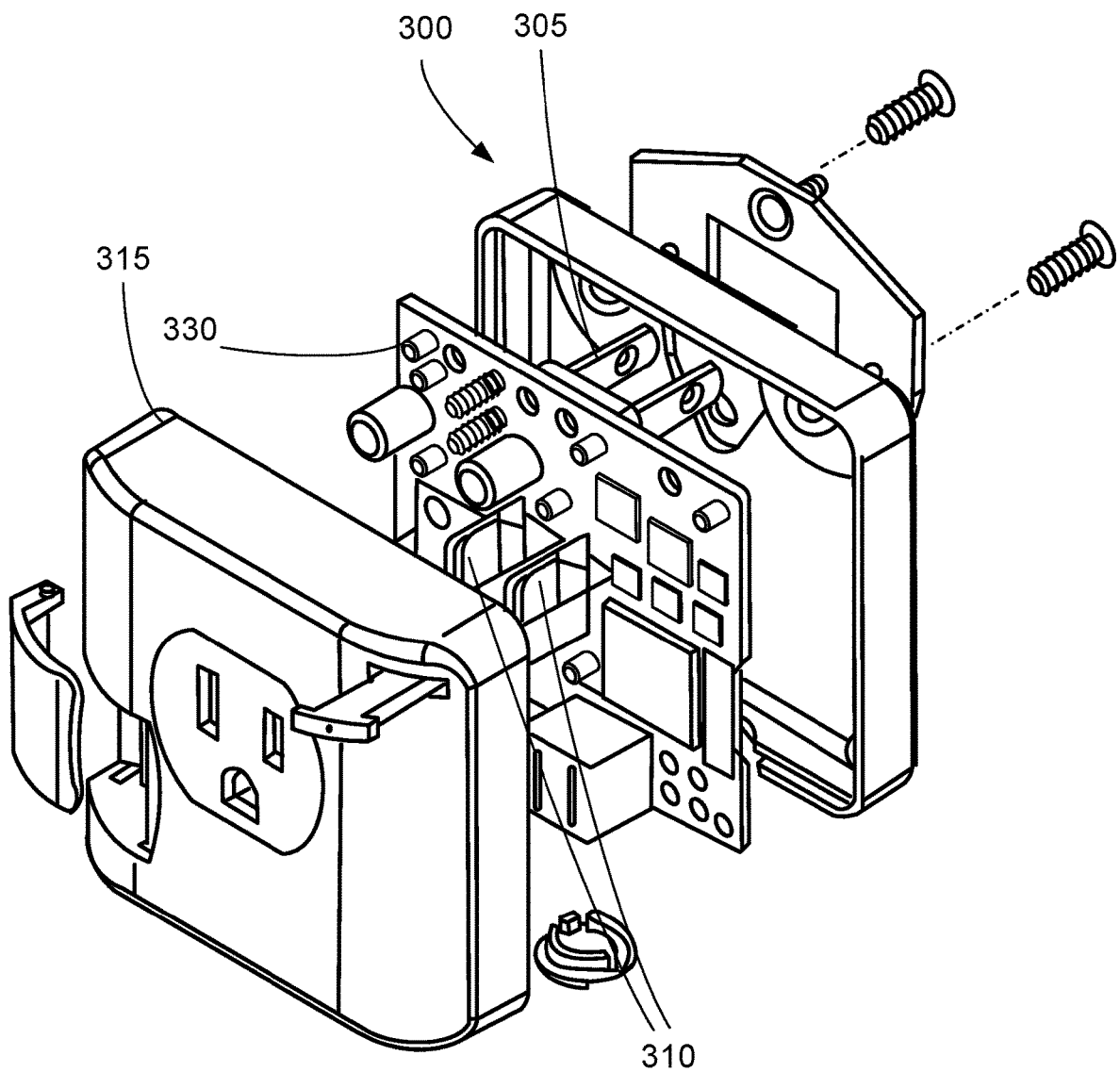
FIGS. 2A-2D are exploded perspective, front perspective, bottom perspective, and rear perspective views of an example of an in-line device for controlling a ventilation system.
Figure 2B:
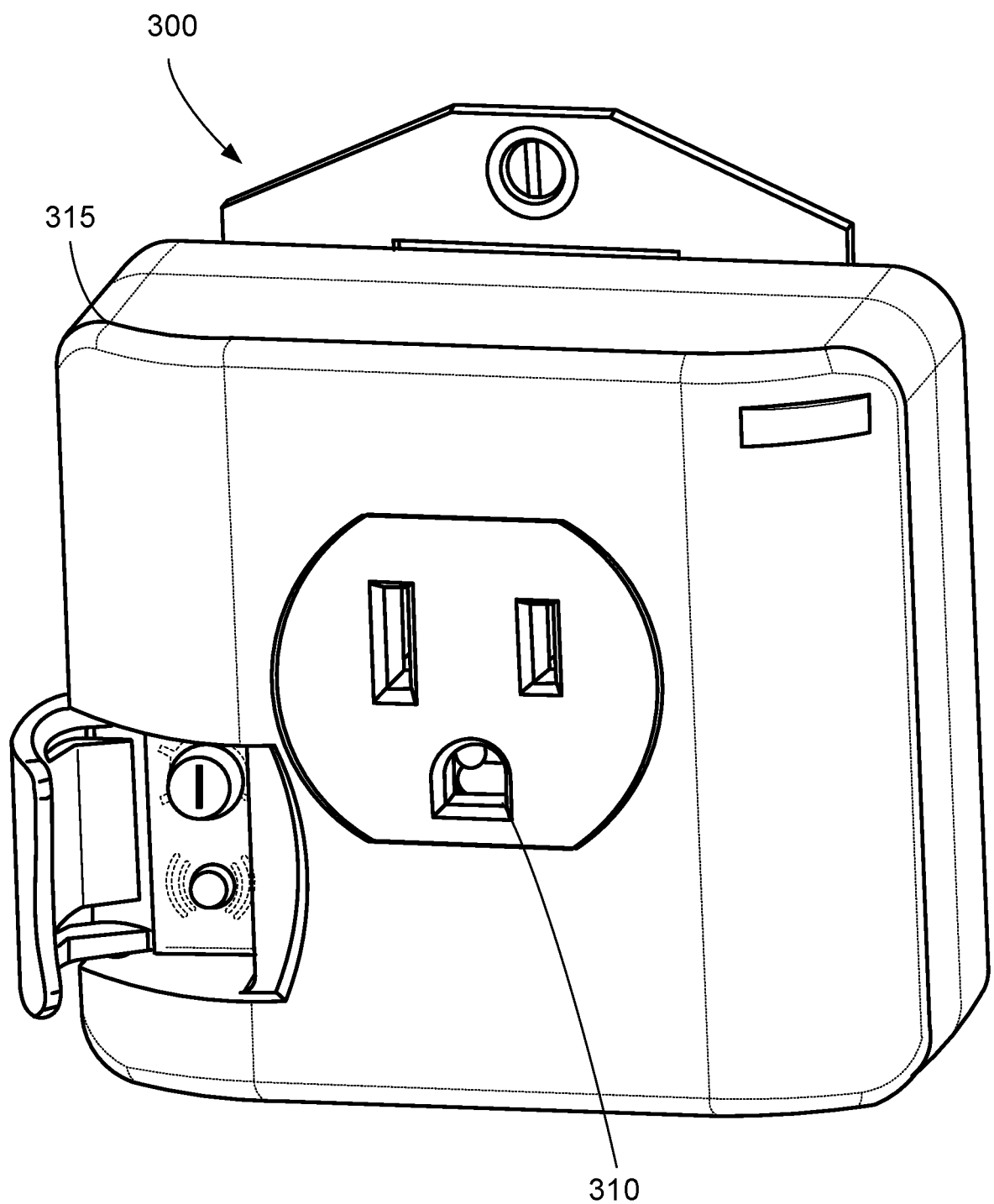
Figure 2C:
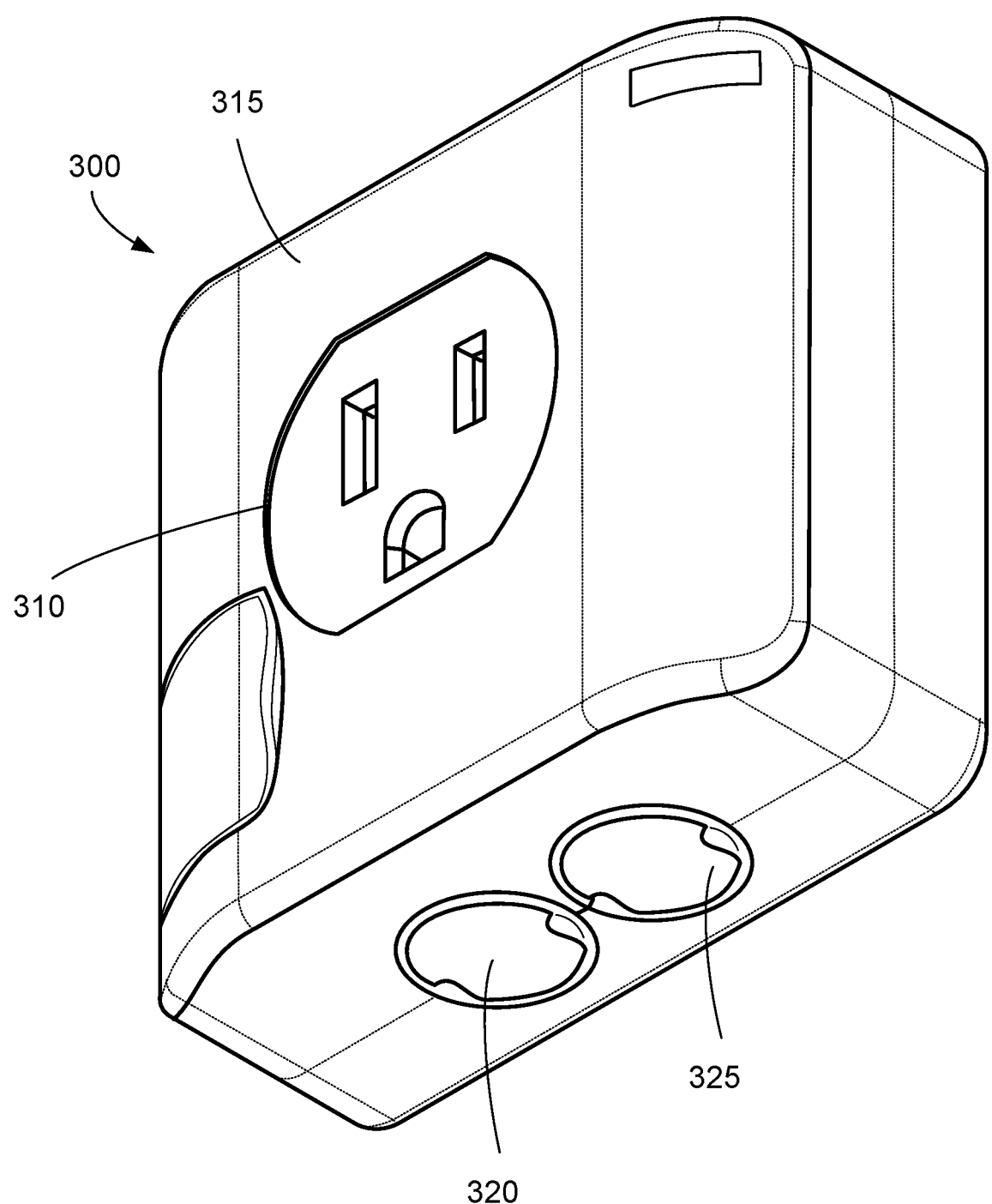
Figure 2D:
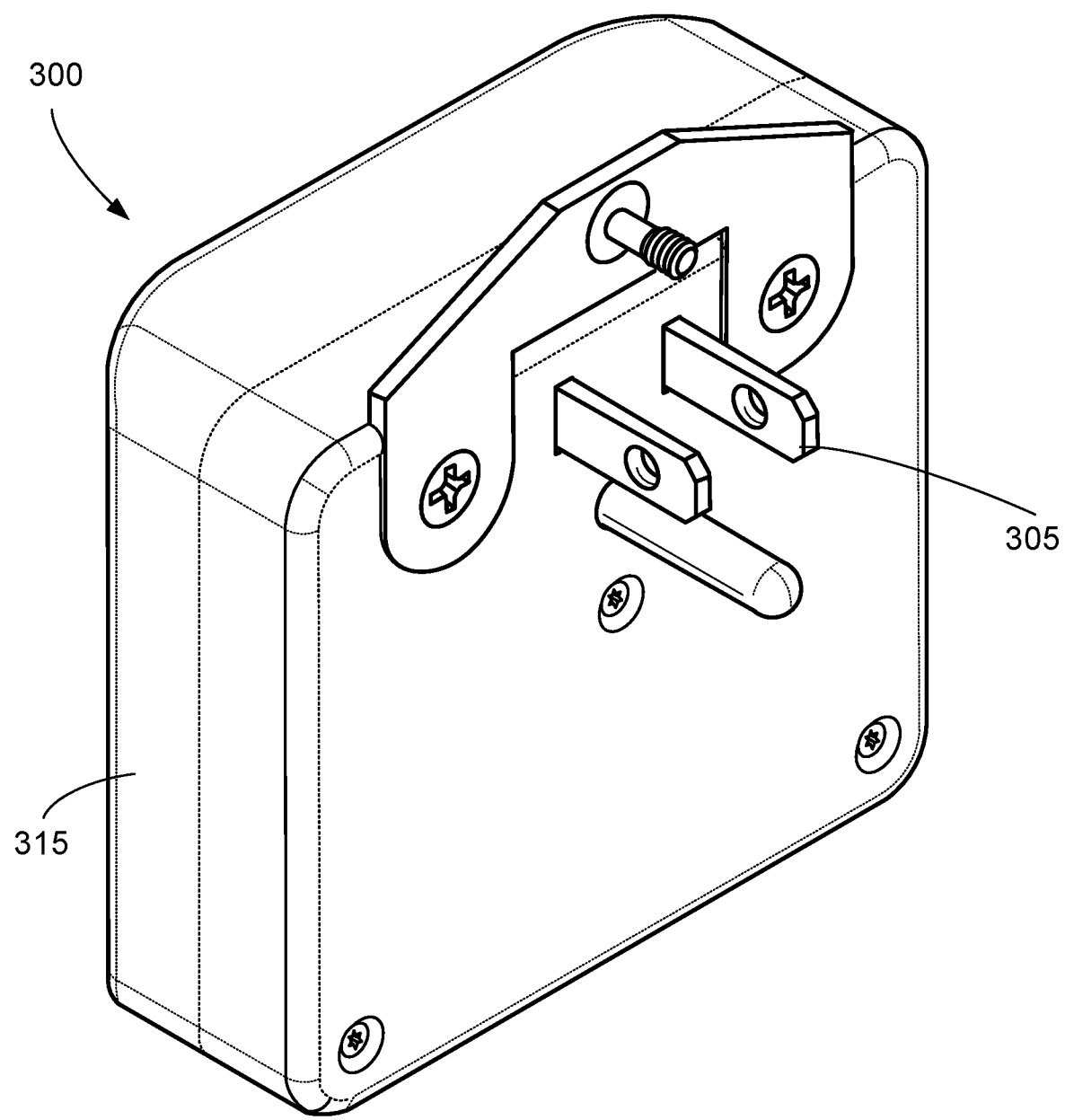

Referring to FIG. 1, a control system 100 for a ventilation system 200 includes an in-line device 300, the ventilation system 200, a first sensor system 400, and a second sensor system 500. The in-line device 300 is used for controlling the ventilation system 200 to provide mechanical ventilation for an enclosed space. The ventilation system 200 is configured to produce a first airflow 205 (e.g., an inflow into the enclosed space 10) from an external environment 20 to the enclosed space 10 and a second airflow 210 (e.g., an outflow from the enclosed space 10) from the enclosed space 10 to the external environment 20. For example, the ventilation system 200 can include a first air blower 215 (e.g., an electrically-operable fan or other device for producing an airflow) to produce the first airflow 205 and a second air blower 220 (e.g., an electrically-operable fan or other device for producing an airflow) to produce the second airflow 210.

The first sensor system 400 is positioned in a flow path for the first airflow 205, and the second sensor system 500 is positioned in a flow path for the second airflow 210. The first and second sensor systems 400, 500 are configured to generate data indicative of parameters of the first airflow 205 and the second airflow 210, respectively. As shown in FIG. 1, the in-line device 300 can be in communication with the first sensor system 400 and the second sensor system 500 such that the in-line device 300 can control the ventilation system 200 based on information detected by the first and second sensor systems 400, 500 (e.g., information indicative of flow rates, humidity, temperature, or other parameters of the first airflow 205 and the second airflow 210). As described in this disclosure, the in-line device 300 is electrically connected to the ventilation system 200 and is configured to control the ventilation system 200 based on the data generated by the sensor systems 400, 500 such that the ventilation system 200 can be operated more efficiently.

The ventilation system 200 can be an HRV system or an ERV system. For example, the ventilation system 200 includes a first inlet 225 through which the first air blower 215 draws in air from the external environment 20 and a first outlet 230 through which the first air blower 215 delivers air from the external environment 20 into the enclosed space 10. In other words, the first airflow 205 is drawn in through the first inlet 225 and is exhausted through the first outlet 230. The ventilation system 200 further includes a second inlet 235 through which the second air blower 220 draws in air from the enclosed space 10 and a second outlet 240 through which the second air blower 220 delivers the air from the enclosed space 10 into the external environment 20. In other words, the second airflow 210 is drawn in through the second inlet 235 and is exhausted through the second outlet 240. The ventilation system 200 further includes a core 245 that serves as a heat exchanger between the first airflow 205 and the second airflow 210. As discussed in this disclosure, the core 245 allows any heating or cooling provided to air within the enclosed space 10 (e.g., air in the second airflow 210) to be recovered by air coming into the enclosed space 10 from the external environment 20 (e.g., air in the first airflow 205). The core 245 can, in implementations in which the ventilation system is an ERV system, serve as a heat and moisture exchanger, thereby also allowing transfer of moisture from the second airflow 210 to the first airflow 205.

The core 245 can be removed, e.g., from a housing of the ventilation system 200, and replaced with a new core. The core 245 may need to be replaced when clogs or other obstructions in the core 245 are present.

The ventilation system 200 can include a power line 250 including an electrical interface 255 for connecting to a corresponding electrical interface. In examples in which the in-line device 300 is not present, the ventilation system 200 could be directly connected to an electrical outlet 30 (e.g., a wall outlet), thereby allowing power from a power grid to be delivered directly to the ventilation system 200 via the power line 250. In the example shown in FIG. 1 and in the example shown in FIGS. 2A-2D, the in-line device 300 includes a first electrical interface 305 and a second electrical interface 310. The electrical interface 255 of the ventilation system 200 is connected to the second electrical interface 310 of the in-line device 300, and the first electrical interface 305 of the in-line device 300 is in turn connected to the electrical outlet 30. Power can be delivered through an electrical conduit of the in-line device 300, through the power line 250, and to the ventilation system 200. The power delivered to the ventilation system 200 can be used to control the first and second air blowers 215, 220 of the ventilation system 200.

FIGS. 2A-2D illustrate an example of the in-line device 300. The in-line device 300 includes a housing 315 and electrical components mounted relative to the housing 315 for enabling the functionality of the in-line device 300 described in this disclosure.

In the example illustrated in FIGS. 2A-2D, the housing 315 supports the electrical components of the in-line device 300 in such a manner that the in-line device 300 can be used as an in-wall device. When the first electrical interface 305 is connected to the electrical outlet 30, the connection supports the in-line device 300 (e.g., including the housing 315 and the electrical components of the in-line device 300)

above a floor of the enclosed space 10 and on a wall of the electrical outlet 30, thereby allowing the in-line device 300 to be used as an in-wall device mounted to the electrical outlet 30.

The electrical components of the in-line device 300 include the first electrical interface 305, the second electrical interface 310, first and second sensor ports 320, 325, and a controller 330. The housing 315 is configured to support each of the first electrical interface 305, the second electrical interface 310, the first and second sensor ports 320, 325, and the controller 330.

The first electrical interface 305 is a plug insertable into a wall outlet, e.g., the electrical outlet 30 of FIG. 1. The second electrical interface 310 is a socket for receiving an electrical interface, e.g., a plug or the electrical interface 255 of the ventilation system 200 of FIG. 1. The first electrical interface 305 and the second electrical interface 310 are connected to the controller 330.

In the example illustrated in FIGS. 2A-2D, the first sensor port 320 and the second sensor port 325 are wired interfaces for cables of the sensor systems 400, 500 (shown in FIG. 1). A cable of the first sensor system 400 is connected to the first sensor port 320, and a cable of the second sensor system 500 is connected to the second sensor port 325. The cables serve to communicate data between the in-line device 300 and the first sensor system 400 and to communicate data between the in-line device 300 and the second sensor system 500. The in-line device 300 can also feed power received from the electrical outlet 30 through the first electrical interface 305 to the sensor systems 400, 500, thereby providing electrical power for the sensor systems 400, 500.

Figure 3A:
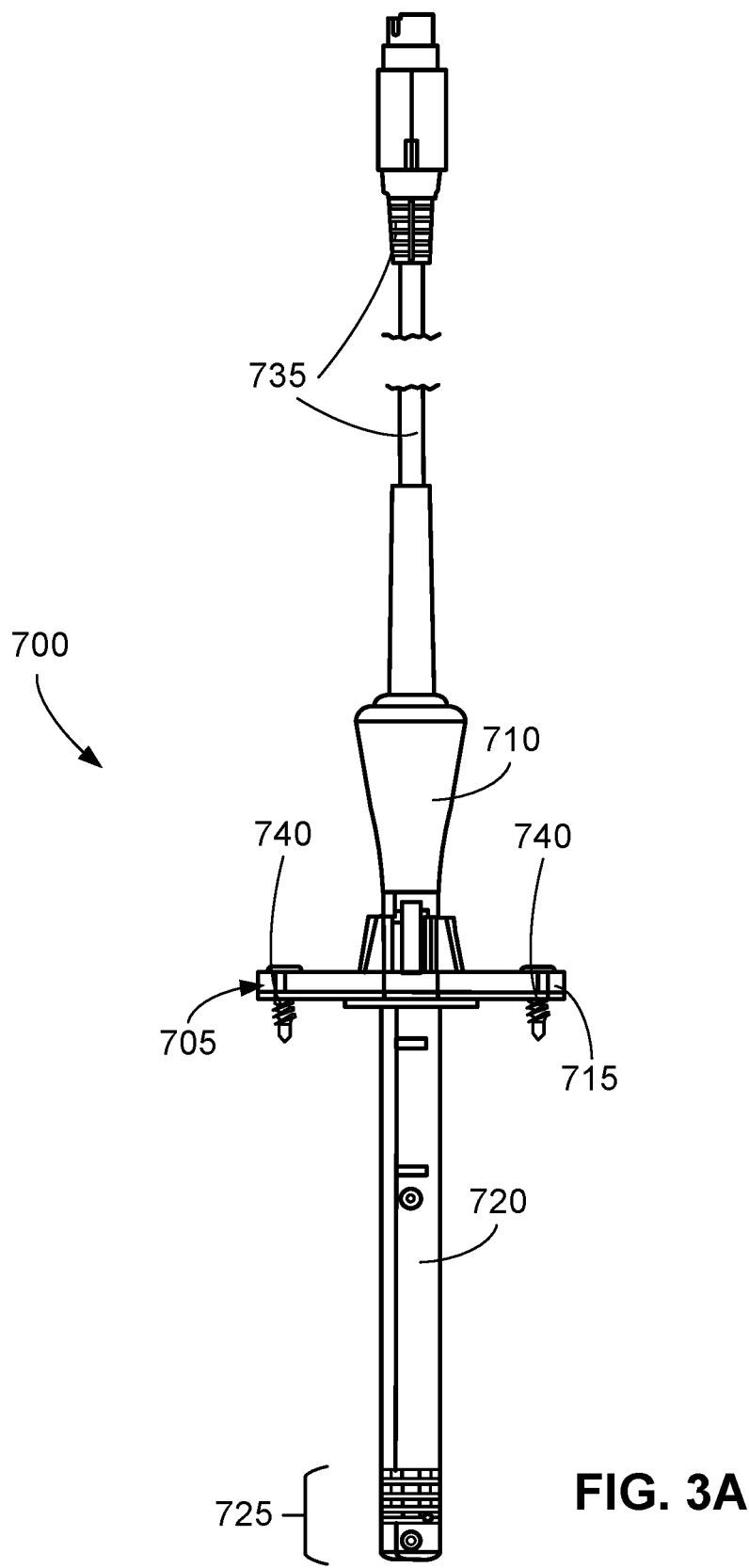
FIGS. 3A-3B are front and perspective views of an example of a sensor system for a ventilation system.
Figure 3B:
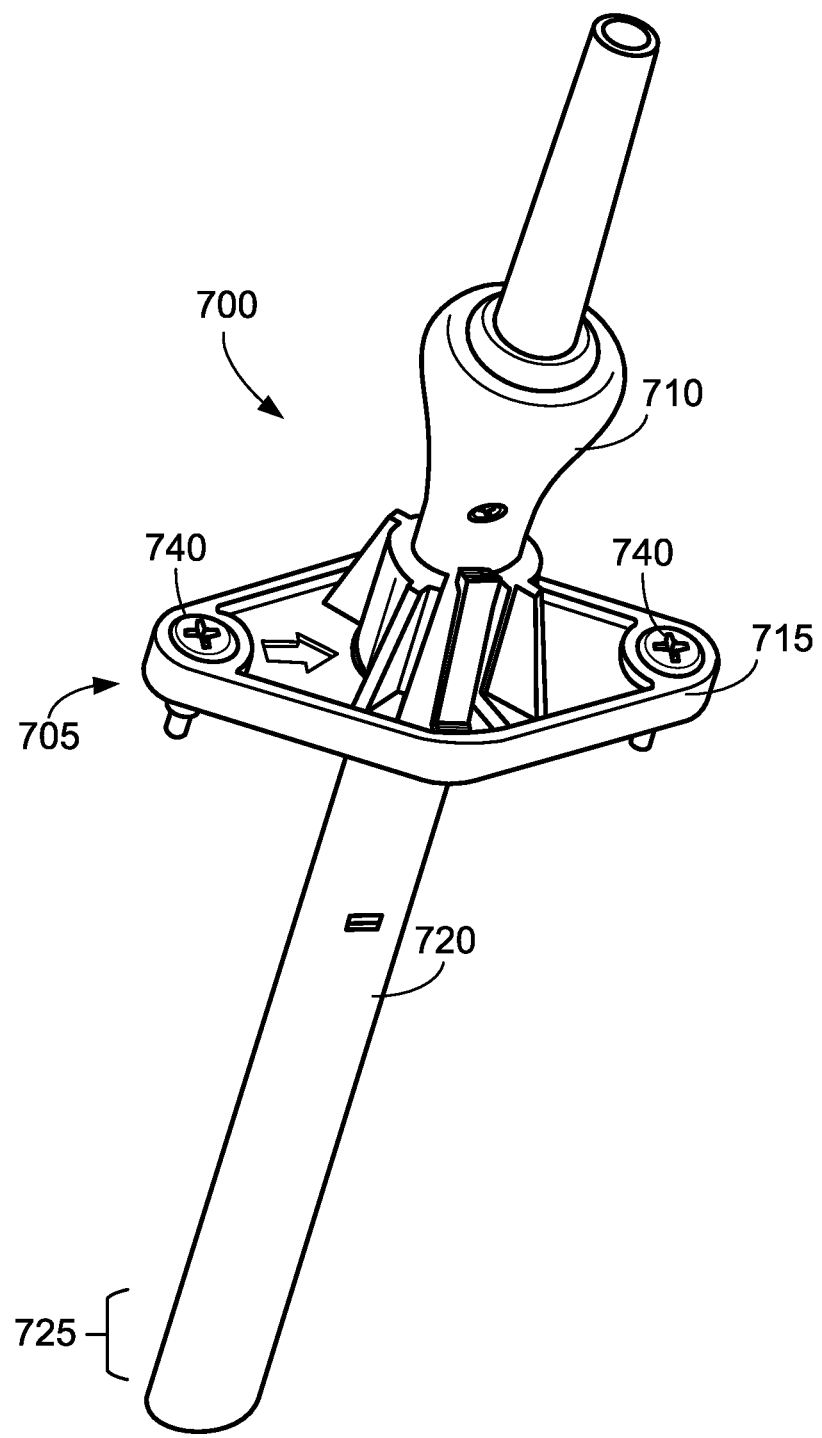
Figure 3C:
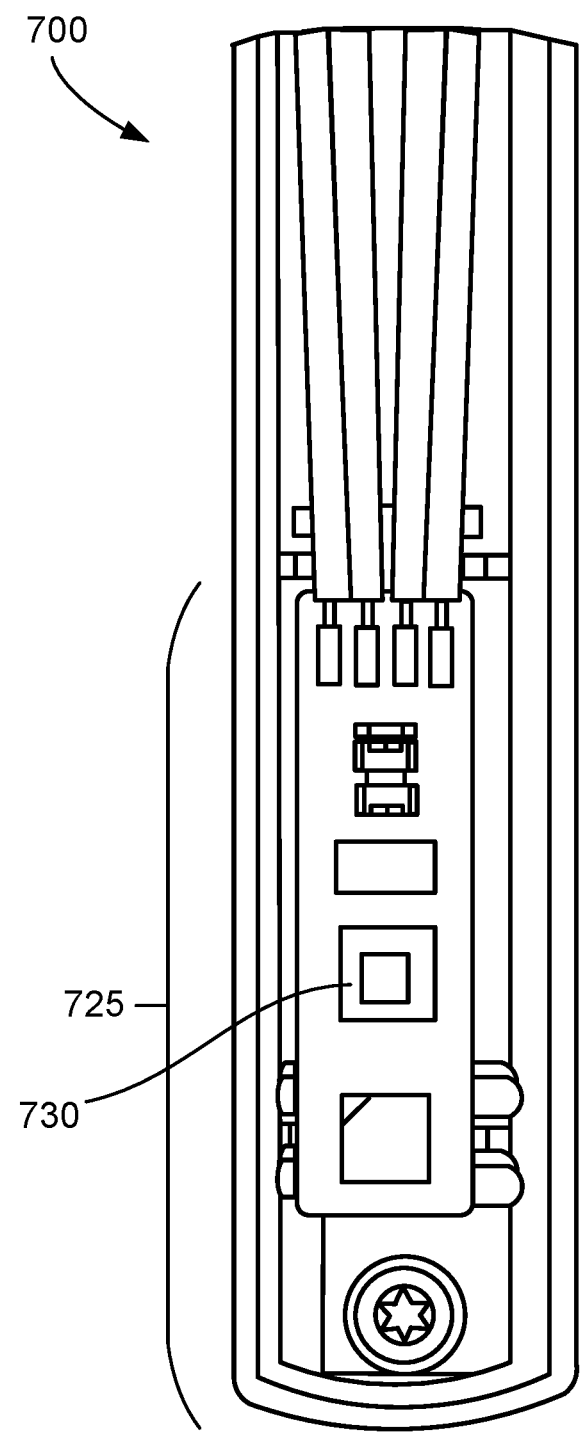
FIG. 3C is a front view of an electronic sensor positioned within a sensor portion of the sensor system of FIGS. 3A-3B.

FIGS. 3A-3C illustrate an example of a sensor system 700 (e.g., the sensor system 400 or the sensor system 500). In the example illustrated in FIG. 1, the sensor system 400 and the sensor system 500 can both be implemented as the sensor system 700, though differ from one another in that the sensor system 400 and the sensor system 500 are placed at different positions relative to the ventilation system 200.

The sensor system 700 includes a housing 705 that includes a base 710, a mounting plate 715 from which the base 710 extends, and an elongate member 720 extending from the mounting plate 715. The base 710 can be easily grasped by a user. The mounting plate 715 can, for example, be mounted directly to an inlet or an outlet of the ventilation system 200 shown in FIG. 1 (e.g., via fasteners 740). The elongate member 720 houses one or more sensors. A sensor portion 725 of the elongate member 720 includes an opening to allow airflow to pass over, for example, a sensor 730 (shown in FIG. 3C), thereby allowing the sensor 730 to measure a parameter of the airflow. The elongate member 720 is sufficiently long to allow the sensor 730 to be positioned toward a center of the flow path for the airflow.

The sensor system 700 can include one or more sensors at the sensor portion 725. The one or more sensors can measure one or more parameters of the airflow. The one or more parameters can include one or more of a flow rate (e.g., mass air flow, volume air flow), a relative humidity, a temperature, or air quality (e.g., a gas sensor, a particulate sensor, etc.).

The sensor system 700 includes a cable 735 extending from the base 710 of the housing 705. The cable 735 is connectable to a sensor port (e.g., the sensor port 320 or the sensor port 325) of the in-line device 300. As described in this disclosure, the cable 735 is configured to communicate data collected by the one or more sensors of the sensor system 700 (e.g., the sensor 730) to the in-line device 300.

Figure 4:
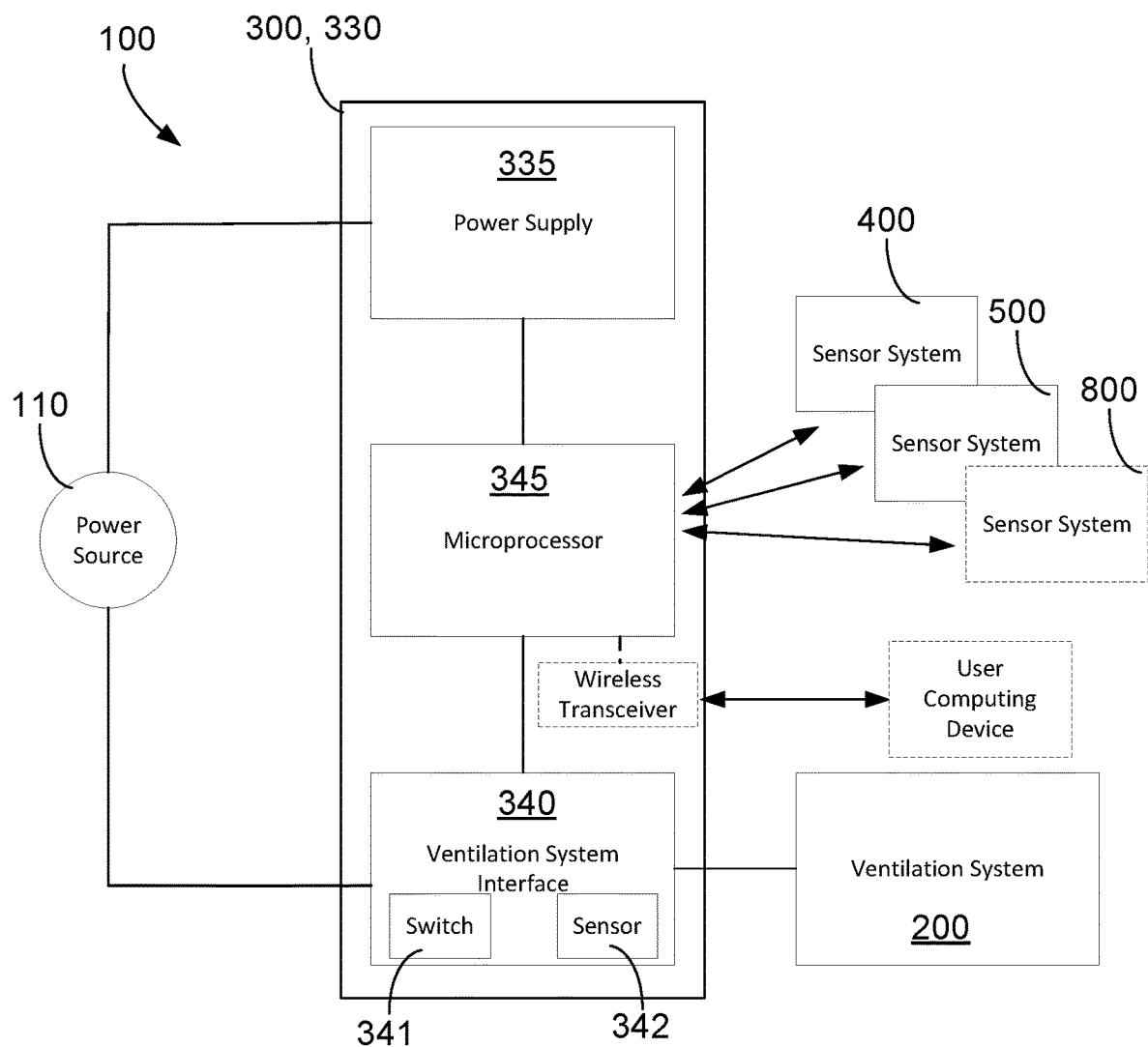
FIG. 4 is a block diagram of an example of a system of devices for controlling a ventilation system.

FIG. 4 is a block diagram of an example of the control system 100. The control system 100 includes the controller 330 (e.g., of the in-line device 300), a power source 110, the sensor system 400, the sensor system 500, and the ventilation system 200. The power source 110, e.g., the power grid (e.g., 110 volts AC or 220 volts AC), is connected to the in-line device 300 and the controller 330 of the in-line device 300 and provides power to the in-line device 300 and the controller 330.

The controller 330 of the in-line device 300 includes a power supply 335, a ventilation system interface 340, and a microprocessor 345. The power supply 335 supplies power received from the power source 110 to the electrical components of the in-line device 300. The microprocessor 345 is configured to receive data and, based on the data, control operations of the controller 330. For example, the microprocessor 345 can operate the ventilation system interface 340.

The ventilation system interface 340 is operable to control delivery of power from the power source 110 to the ventilation system 200 and to monitor an amount of energy consumed by the ventilation system 200. The ventilation system interface 340 can include a switch 341 and a sensor 342. The switch 341 is operable to set a level of power delivered to the ventilation system 200. For example, the switch 341 can include two or more settings for different levels of power delivered to the ventilation system 200. The switch 341 is controllable by the microprocessor 345, e.g., based on the data collected by the sensor systems 400, 500. The sensor 342 can measure an amount of electrical energy used by the ventilation system 200. For example, the sensor 342 is an energy measuring chip for measuring forward active energy, reverse active energy, absolute active energy, forward (inductive) reactive energy, reverse (capacitive) reactive energy, or absolute reactive energy consumed by the ventilation system 200.

As described in this disclosure, the in-line device 300 can include sensor ports (e.g., the sensor ports 320, 325 shown in FIGS. 2A-2D). The sensor ports can be implemented as wired interfaces or a wireless interface. The sensor ports for the in-line device 300 allow the microprocessor 345 to receive data from the sensor systems 400, 500.

In some implementations, the control system 100 can include a sensor system 800 distinct from the sensor systems 400, 500. The sensor system 800 can provide additional data to the controller 330 for controlling the operations of the ventilation system 200. The sensor system 800 can be a wirelessly connected device (e.g., connected to the controller 330 via a wireless transceiver 350 as discussed below) that generates data usable by the control system 100. The sensor system 800 can include an air quality monitor, a temperature sensor, a humidity sensor, an occupancy sensor, or other sensor. For example, the sensor system 800 can be a sensor system for detecting an air quality in the external environment 20 (shown in FIG. 1), a sensor system for detecting an air quality in the enclosed space 10 (shown in FIG. 1), or a sensor system for detecting an occupant in the enclosed space 10 (shown in FIG. 1). The sensor system 800, in some implementations, does not measure parameters of airflows generated by the ventilation system 200 but, rather, measures parameters associated with air present in the external environment 20 or present in the enclosed space 10.

In some implementations, the in-line device 300 can include a wireless transceiver 350. In implementations in which the sensor ports are implemented as a wireless interface, the sensor ports can be part of the wireless transceiver 350. In some implementations, the in-line device 300 can include a combination of wireless ports and wired ports. For example, the in-line device 300 can include wired ports for the sensor systems 400, 500 and can include a wireless port for the sensor system 800. In some implementations, the in-line device 300 only includes wireless ports. The sensor systems 400, 500, 800 can include wireless transceivers for communicating with the in-line device 300. In some implementations, the controller 330 is in wireless communication with a user computing device 900, e.g., via the wireless transceiver 350. As described in greater detail below, the user computing device 900 can be used to present information collected by the controller 330 or can be used to control operations of the ventilation system 200.

Figure 5:
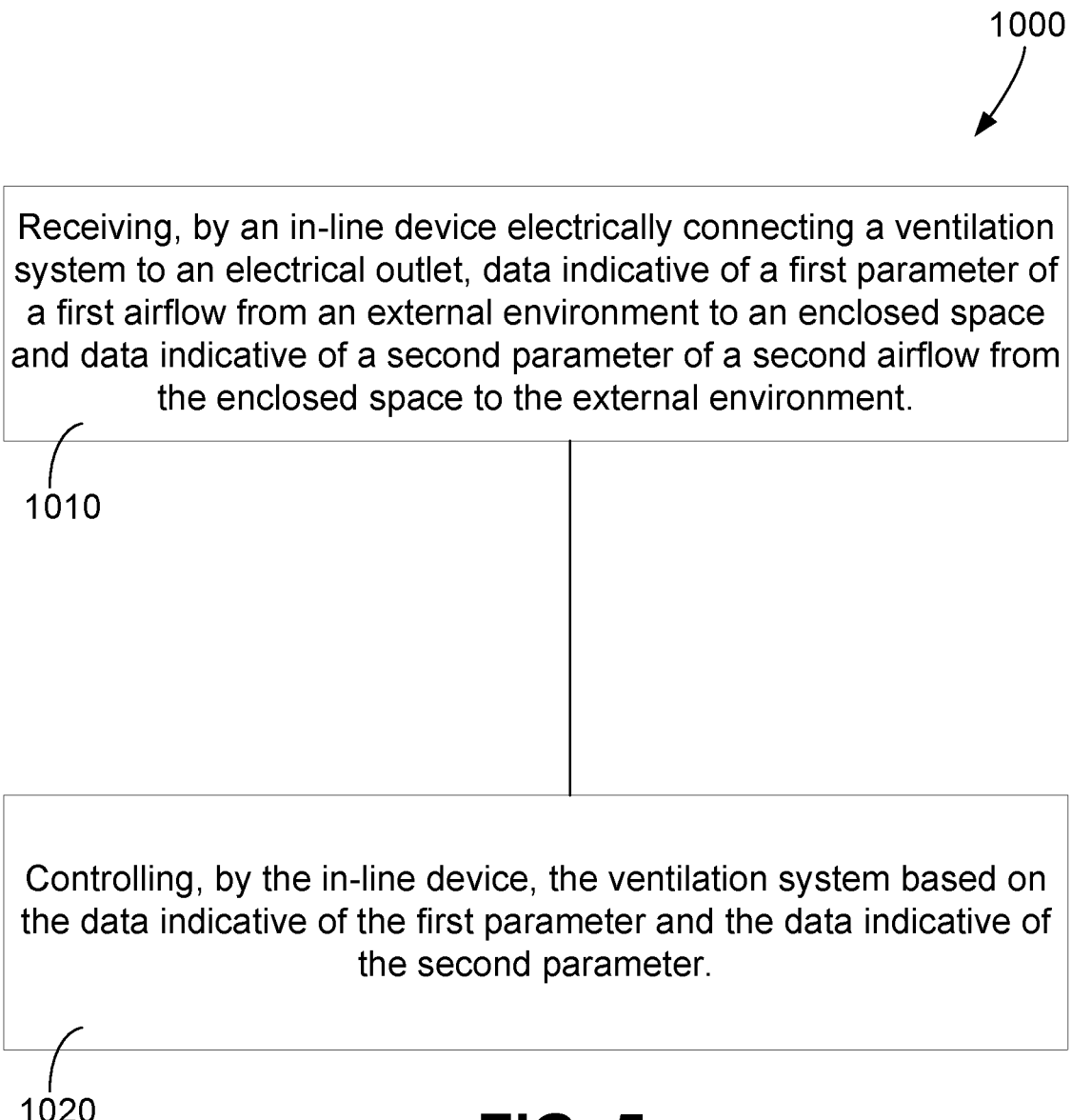
FIG. 5 is a flowchart of an example of a process for controlling a ventilation system using an in-line device.

FIG. 5 a flowchart of an example of a process 1000 for controlling a ventilation system (e.g., the ventilation system 200 or other ventilation systems described in this disclosure) using an in-line device (e.g., the in-line device 300 or other in-line devices described in this disclosure). As discussed in this disclosure, the ventilation system is configured to produce a first airflow (e.g., the first airflow 205) from an external environment (e.g., the external environment 20) into an enclosed space (e.g., the enclosed space 10) and a second airflow (e.g., the second airflow 210) from the enclosed space to the external environment. The process 1000 can be performed by a controller (e.g., the controller 330) of the in-line device.

The process 1000 includes a receiving operation 1010. In the receiving operation 1010, data are received by the in-line device, which electrically connects the ventilation system to an electrical outlet (e.g., the electrical outlet 30). The ventilation system and the in-line device are connected via electrical interfaces, as described in this disclosure. The data include data indicative of a first parameter of the first airflow from the external environment to the enclosed space and data indicative of a second parameter of the second airflow from the enclosed space to the external environment. In other words, the first parameter is an inflow parameter, and the second parameter is an outflow parameter.

The first parameter and the second parameter can be measured by first and second sensor systems (e.g., the sensor systems 400, 500). In particular, the sensor systems can be positioned in flow paths of the first airflow and the second airflow to detect the parameter of the first airflow and the parameter of the second airflow. The in-line device can receive the data using sensor ports (e.g., the sensor ports 320, 325, wired ports, wireless ports, or other data ports described in this disclosure).

The process 1000 includes a controlling operation 1020. In the controlling operation 1020, the ventilation system is controlled based on the data indicative of the first parameter and the data indicative of the second parameter. By using these data indicative of the first parameter and the second parameter, the ventilation system can be controlled to efficiently provide an optimal amount of fresh air for the enclosed space. The first parameter and the second parameter can be, in some implementations, flow rates of the first and second airflows, a relative humidity of air in the first airflow and a relative humidity of air in the second airflow, a temperature of air in the first airflow and a temperature of air in the second airflow, or an air quality of air in the first airflow and an air quality of air in the second airflow. In some implementations, multiple parameters (e.g., two or more of flow rate, relative humidity, and temperature) can be used to control the ventilation system.

The control of the ventilation system can be further based on characteristics of the enclosed space or characteristics of use of the enclosed space, such as a size of the enclosed space, a number of occupants of the enclosed space, an amount of time that the enclosed space has occupants, or other characteristics indicative of a demand for fresh air in the enclosed space. For example, the receiving operation 1010 can further include an operation for wirelessly receiving, by the in-line device, data from a remote sensor system (e.g., the sensor system 800, an occupancy sensor, a relative humidity sensor, a temperature sensor, an air quality sensor, or other sensor in the enclosed space positioned away from the ventilation system or other sensor in the external environment positioned away from the ventilation system).

The in-line device can control the ventilation system by controlling an amount of power delivered to the ventilation system. The amount of power delivered to the ventilation system is based on the data received from the sensor systems 400, 500. In some implementations, controlling the amount of power involves controlling the in-line device such that no power is delivered to the ventilation system. In some implementations, controlling the amount of power involves controlling the in-line device such that a full amount of power from the power source is delivered to the ventilation system. In some implementations, controlling the amount of power involves controlling the in-line device such that a percentage of the full amount of power is delivered to the ventilation system. The power levels set by the in-line device can include two or more power levels. If the two or more power levels include a partial power level, the partial power level can be between 0% and 100%, e.g., between 25% and 75%, between 25% and 50%, between 35% and 65%, between 50% and 75%, etc. In some implementations, the two or more power levels include multiple partial power levels.

In some implementations, controlling the amount of power involves controlling the in-line device such that the ventilation system is powered for a period of time, with the period of time being based on the data received from the sensor systems 400, 500.

In some implementations, in addition to or as an alternative to the controlling operation 1020, the in-line device can provide information to a user computing device (e.g., the user computing device 900, a smart phone, a personal computer, a table, or other user computing device) to cause the user computing device to provide a notification or alert indicative of an operation of the ventilation system. The notifications and alerts described in this disclosure can be visual (e.g., presented on a display of the user computing device), auditory (e.g., emitted by a speaker of the user computing device), and/or tactile (e.g., generated by a vibration unit of the user computing device).

In implementations in which the first parameter and the second parameter are first and second flow rates of the first and second airflows, respectively, the ventilation system can be controlled based on the first flow rate detected or measured by the first sensor system and based on the second flow rate detected or measured by the second sensor system. For example, if a difference between the first flow rate and the second flow rate is greater than or equal to a threshold value, the difference can indicate that maintenance of the ventilation system is needed. The ventilation system can be controlled such that the in-line device does not provide power to the ventilation system, i.e., the in-line device deactivates the ventilation system. In some implementations, the in-line device can be used to detect that the core (e.g., the core 245) of the ventilation system is clogged based on the detected first flow rate and the detected second flow rate, e.g., based on the difference between the first flow rate and the second flow rate.

In some implementations, the first flow rate and the second flow rate can be used by the in-line device for controlling an amount of time that the ventilation system is activated. For example, a desirable amount of ventilation may be computed based on the size of the enclosed space and the supply flow rate (e.g., the flow rate of the first airflow). To achieve the desirable amount of ventilation, the in-line device can be provided with information on the size of the enclosed space (e.g., input by the user using the user computing device or another user interface in communication with the in-line device) and can receive data from the first sensor system to determine a flow rate of the first airflow. The in-line device can then compute the amount of time to operate the ventilation system to achieve the desired amount of ventilation.

In some implementations, rather than using a difference between the first flow rate and the second flow rate as an indicator of the presence of a clog, the controller uses a threshold value for the first flow rate or a threshold value for the second flow rate as the basis for determining that a clog of the ventilation system is present. For example, if the first flow rate is no more than a threshold flow rate, the controller can determine a clog is present in a flow path for the first airflow. If the second flow rate is no more than the threshold flow rate, the controller can determine a clog is present in the flow path for the second airflow. Alternatively, if the first flow rate or the second flow rate is no more than the threshold flow rate, the controller can determine that a clog is present in the core. The in-line device can deactivate the ventilation system in response to detecting the presence of the clog.

In some implementations, in response to detecting the presence of the clog, the in-line device can provide a notification or alert (e.g., via the user computing device) indicating that the core of the ventilation system requires maintenance, e.g., requires replacement or cleaning.

In some implementations, data indicative of extreme conditions (e.g., extreme temperatures, extreme humidity, or extreme air quality) in the external environment can be used as the basis for deactivating the ventilation system to prevent the ventilation system from bringing air with bad quality into the enclosed space.

In implementations in which the first parameter and the second parameter are a first relative humidity of the first airflow and a second relative humidity of the second airflow, respectively, the ventilation system can be controlled by the in-line device based on the first relative humidity detected or measured by the first sensor system and based on the second relative humidity detected or measured by the second sensor system. The ventilation system can be controlled based on a difference between the first relative humidity and the second relative humidity, a value of the first relative humidity, or a value of the second relative humidity. For example, if the first relative humidity is greater than or equal to a threshold value (e.g., the external environment has high humidity), then the ventilation system can be deactivated to prevent high-humidity air from being drawn into the enclosed space.

In implementations in which the first parameter and the second parameter are a first temperature of the first airflow and a second temperature of the second airflow, respectively, the ventilation system can be controlled based on the first temperature detected or measured by the first sensor system and based on the second temperature detected or measured by the second sensor system. The ventilation system can be controlled by the in-line device based on a difference between the first temperature and the second temperature, a value of the first temperature, or a value of the second temperature. For example, if the first temperature is greater than or equal to a threshold value (e.g., the external environment is hot), then the ventilation system can be disabled to prevent hot air from being drawn into the enclosed space. Specifically, the high air temperature of the external environment could potentially cause operation of the ventilation system to be too inefficient due to the excess heat being drawn into the enclosed space.

In implementations in which the in-line device receives characteristic data from a sensor system for measuring a characteristic of the enclosed space or a characteristic of a user of the enclosed space, the in-line device can operate the ventilation system based on the characteristic data.

If the characteristic data include data indicative of an air quality in the external environment, the in-line device can operate the ventilation system based on the data indicative of the air quality. For example, if the air quality is greater than or equal to a threshold value, the in-line device can deactivate the ventilation system to prevent air with poor air quality from being drawn into the enclosed space. If the air quality in the external environmental falls below the threshold value, the in-line device can activate the ventilation system again to allow the ventilation system to resume drawing fresh air into the enclosed space.

If the characteristic data include data indicative of an air quality in the enclosed space, the in-line device can operate the ventilation system based on the data indicative of the air quality. For example, if the air quality is greater than or equal to a threshold value, the in-line device can activate the ventilation system to allow fresh to be drawn into the enclosed space to replace the air with poor quality in the enclosed space. If the air quality in the enclosed space falls below the threshold value, the in-line device can deactivate the ventilation system again.

In some implementations, the in-line device can cause the user computing device to present a notification or an alert based on the data and information collected by the in-line device. The notification or the alert can provide the user with performance metrics of the ventilation system. For example, if the in-line device collects energy consumption data (e.g., measured by the sensor 342), the in-line device can cause the user computing device to present a notification or alert indicative of the energy consumption of the ventilation system. In addition, the user computing device can provide a notification or alert indicative of values of the relative humidity, the temperature, the air quality, or the flow rates of the first and second airflows. In further implementations, the user computing device can provide a notification or an alert to the user indicating that the air quality in the enclosed space is poor and that the user should activate a ventilation system. In further implementations, the user computing device can indicate the air quality in the external environment is poor and that the user should deactivate the ventilation system. In some implementations, the user computing device has an application (e.g., a smart phone application) that provides the notifications and alerts described in this disclosure.

A number of implementations have been described. While this specification contains many specific implementation details, these should not be construed as limitations on the scope of what is being claimed, which is defined by the claims themselves, but rather as descriptions of features that may be specific to particular implementations of particular inventions. It will be understood that various modifications may be made.

While the sensor systems 400, 500 are described as being positioned at the first outlet 230 for the first airflow 205 and the second inlet 235 for the second airflow 210, i.e., positioned on the inlet and the outlet for the enclosed space 10, in other implementations, the sensor systems 400, 500 can be positioned at other locations of the ventilation system 200. For example, the sensor systems 400, 500 can both be positioned on the inlet and outlet for the external environment 20, e.g., at the first inlet 225 and the second outlet 240. Alternatively, one sensor system can be positioned on an inlet or an outlet of the enclosed space 10, and another sensor system can be positioned on an inlet or an outlet of the external environment 20. One sensor system measures a parameter for the first airflow, while the other sensor measures a parameter for the second airflow.

In the implementation presented in FIGS. 2A-2D, the in-line device 300 is an in-wall device in which the housing 315 and the electrical components of the in-line device 300 can be supported above a floor of the enclosed space 10 via the physical connection between the first electrical interface 305 and the electrical outlet 30. In other implementations, the in-line device 300 is a device that is connected to the electrical interface 255 of the ventilation system 200 and that includes a power line that extends from the housing 315. The power line of the in-line device 300 includes the first electrical interface 305 that connects to the electrical outlet 30. The in-line device 300 in such implementations is not supported above the floor of the enclosed space via the physical connection between the first electrical interface 305 and the electrical outlet 30.

While the sensor ports 320, 325 of the in-line device 300 are described as physical sensor ports for receiving cables of the sensor systems 400, 500, in other implementations, the sensor ports 320, 325 are part of a wireless port for receiving data wirelessly from the sensor systems 400, 500. The in-line device 300 includes a wireless port including the sensor port 320 and the sensor port 325, and the in-line device 300 can control the ventilation system 200 based on information collected by the sensor systems 400, 500 that is communicated to the in-line device 300 via the sensor ports 320, 325.

The subject matter and the actions and operations (e.g., the actions and operations of the process 1000, the actions and operations performed by the control system 100, the actions and operations performed by the in-line device 300, the actions and operations performed by the user computing device 900, etc.) described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively or in addition, the carrier can be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

The subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML, page, to a user device, e.g., for purposes of displaying data to and receiving user input from a user interacting with the device, which acts as a client. Data generated at the user device, e.g., a result of the user interaction, can be received at the server from the device.

Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

While operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products. Furthermore, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Accordingly, other implementations are within the scope of the claims.

What is claimed is:

1. An in-line device for controlling an energy recovery ventilation (ERV) or heat recovery ventilation (HRV) system for an enclosed space, the in-line device comprising:
    a first electrical interface configured to connect to an electrical outlet;
    a second electrical interface configured to receive a power plug for the ERV or HRV system;
    a first sensor port configured to communicate with a first sensor externally mountable to the ERV or HRV system to measure a first parameter of a first airflow that is produced by the ERV or HRV system and that flows from an external environment, through a core of the ERV or HRV system, and to the enclosed space, the first sensor port configured to receive data from the first sensor indicative of the first parameter of the first airflow;
    a second sensor port configured to communicate with a second sensor externally mountable to the ERV or HRV system to measure a second parameter of a second airflow that is produced by the ERV or HRV system and that flows from the external environment, through the core of the ERV or HRV system, and to the enclosed space, the second sensor port configured to receive data from the second sensor indicative of the second parameter of the second airflow; and
    a controller connected to the first sensor port and the second sensor port, the controller configured to control the ERV or HRV system based on the data indicative of the first parameter of the first airflow and the data indicative of the second parameter of the second airflow.

2. The in-line device of claim 1, wherein:
    the first parameter is a first relative humidity of the first airflow, and the second parameter is a second relative humidity of the second airflow.

3. The in-line device of claim 1, wherein:
    the first parameter is a first temperature of the first airflow, and the second parameter is a second temperature of the second airflow.

4. The in-line device of claim 1, wherein:
the first sensor is configured to detect a first flow rate of the first airflow,
the second sensor is configured to detect a second flow rate of the second airflow, and
the controller is configured to detect that the core of the ERV or HRV system is clogged based on the detected first flow rate and the detected second flow rate.

5. The in-line device of claim 4, wherein:
the controller is configured to detect that the core of the ERV or HRV system is clogged by determining that at least one of the detected first flow rate or the detected second flow rate is no more than a threshold flow rate.

6. The in-line device of claim 4, wherein:
the controller is configured to provide a user alert in response to detecting that the core of the ERV or HRV system is clogged.

7. The in-line device of claim 1, wherein:
the first parameter is a first flow rate of the first airflow, and the second parameter is a second flow rate of the second airflow.

8. The in-line device of claim 1, further comprising:
a wireless transceiver configured to receive data from a remote sensor for detecting an air quality in the external environment,
wherein the controller is configured to operate the ERV or HRV system in response to detecting the air quality.

9. The in-line device of claim 8, wherein:
the controller is configured to operate the ERV or HRV system in response to detecting the air quality by deactivating the ERV or HRV system in response to the detected air quality being no less than a threshold air quality.

10. The in-line device of claim 1, further comprising:
a wireless transceiver configured to receive data from a remote sensor for detecting an air quality in the enclosed space,
wherein the controller is configured to operate the ERV or HRV system in response to detecting the air quality.

11. The in-line device of claim 10, wherein:
the controller is configured to operate the ERV or HRV system in response to detecting the air quality by activating the ERV or HRV system in response to the detected air quality being no less than a threshold air quality.

12. The in-line device of claim 1, further comprising:
a wireless transceiver configured to receive data from a remote sensor for detecting an occupant in the enclosed space,
wherein the controller is configured to operate the ERV or HRV system in response to detecting the occupant in the enclosed space.

13. The in-line device of claim 1, wherein:
the controller is configured to control the ERV or HRV system based on the data indicative of the first parameter of the first airflow and the data indicative of the second parameter of the second airflow by:
controlling a power delivered to the ERV or HRV system.

14. The in-line device of claim 1, wherein:
the in-line device is an in-wall device that is mounted to the electrical outlet.

15. The in-line device of claim 1, further comprising:
a housing for the first electrical interface, the second electrical interface, the first sensor port, the second sensor port, and the controller.

16. The in-line device of claim 15, wherein:
the housing is supported on a wall when the first electrical interface is connected to the electrical outlet.

17. The in-line device of claim 1, wherein:
the first sensor port is configured to wirelessly communicate with the first sensor, and
the second sensor port is configured to wireless communicate with the second sensor.

18. The in-line device of claim 1, further comprising:
a sensor to measure an amount of energy consumed by the ERV or HRV system, wherein the controller is configured to provide information to a user computing device to cause the user computing device to present a visual representation of the amount of energy consumed by the ERV or HRV system.

19. The in-line device of claim 1, wherein configurations of the controller to control the ERV or HRV system based on the data indicative of the first parameter of the first airflow and the data indicative of the second parameter of the second airflow comprise:
configurations of the controller to control a first air blower of the ERV or HRV system to produce the first airflow and a second air blower of the ERV or HRV system to produce the second airflow.

20. The in-line device of claim 19, wherein the controller is configured to monitor an amount of energy consumed by the ERV or HRV system and set a level of power delivered to the ERV or HRV system based on the monitored amount of energy.

21. The in-line device of claim 1, wherein the ERV or HRV system corresponds to a ventilation system absent an integrated sensor in a first flow path for measuring the first parameter of the first airflow and absent an integrated sensor in a second flow path for measuring the second parameter of the second airflow.

22. A control system for controlling an energy recovery ventilation (ERV) or heat recovery ventilation (HRV) system for an enclosed space, the control system comprising:
a first sensor externally mountable to the ERV or HRV system to measure a first parameter of a first airflow that is produced by the ERV or HRV system and that flows from an external environment, through a core of the ERV or HRV system, and to the enclosed space, wherein the first sensor is configured to generate data indicative of the first parameter of the first airflow;
a second sensor externally mountable to the ERV or HRV system to measure a second parameter of a second airflow that is produced by the ERV or HRV system and that flows from the external environment, through the core of the ERV or HRV system, and to the enclosed space, wherein the second sensor is configured to generate data indicative of the second parameter of the second airflow; and
an in-line device configured to connect to an electrical outlet and configured to receive a power plug for the ERV or HRV system, the in-line device comprising:
a first sensor port configured to communicate with the first sensor and receive, from the first sensor, the data indicative of the first parameter of the first airflow,
a second sensor port configured to communicate with the second sensor and receive, from the second sensor, the data indicative of the second parameter of the second airflow, and
a controller connected to the first sensor port and the second sensor port, the controller configured to control the ERV or HRV system based on the data indicative of the first parameter and the data indicative of the second parameter.

23. The control system of claim 22, wherein:
the first parameter is a first relative humidity of the first airflow, and the second parameter is a second relative humidity of the second airflow.

24. The control system of claim 22, wherein:
the first parameter is a first temperature of the first airflow, and the second parameter is a second temperature of the second airflow.

25. The control system of claim 22, wherein:
the first sensor is configured to detect a first flow rate of the first airflow,
the second sensor is configured to detect a second flow rate of the second airflow, and
the controller of the in-line device is configured to detect that the core of the ERV or HRV system is clogged based on the detected first flow rate and the detected second flow rate.

26. The control system of claim 22, wherein the in-line device further comprises:
a wireless transceiver configured to receive data from a remote sensor for detecting an air quality in the external environment,
wherein the controller is configured to operate the ERV or HRV system in response to detecting the air quality.

27. The control system of claim 22, wherein:
the first sensor comprises a mounting plate directly mountable to an inlet or an outlet of the ERV or HRV system; and
the second sensor comprises a mounting plate directly mountable to an inlet or an outlet of the ERV or HRV system.

28. The control system of claim 22, wherein:
the first sensor is externally mountable to the ERV or HRV system such that at least a portion of the first sensor is positioned in a flow path for the first airflow; and
the second sensor is externally mountable to the ERV or HRV system such that at least a portion of the second sensor is positioned in a flow path for the second airflow.

29. A method of controlling an energy recovery ventilation (ERV) or heat recovery ventilation (HRV) system for an enclosed space, the method comprising:
receiving, by a first sensor port of an in-line device electrically connecting the ERV or HRV system to an electrical outlet, data indicative of a first parameter of a first airflow that is produced by the ERV or HRV system and that flows from external environment, through a core of the ERV or HRV system, and to the enclosed space, the data indicative of the first parameter of the first airflow being generated by a first sensor externally mountable to the ERV or HRV system;
receiving, by a second sensor port of the in-line device, data indicative of a second parameter of a second airflow that is produced by the ERV or HRV system and that flows from the enclosed space, through the core of the ERV or HRV system, and to the external environment, the data indicative of the second parameter of the second airflow being generated by a second sensor externally mountable to the ERV or HRV system; and
controlling, by the in-line device, the ERV or HRV system based on the data indicative of the first parameter and the data indicative of the second parameter.

30. The method of claim 29, wherein the first parameter is a first relative humidity of the first airflow, and the second parameter is a second relative humidity of the second airflow.

31. The method of claim 29, wherein the first parameter is a first temperature of the first airflow, and the second parameter is a second temperature of the second airflow.

32. The method of claim 29, further comprising:
receiving, by the in-line device, data indicative of a first flow rate of the first airflow and data indicative of a second flow rate of the second airflow; and
detecting, by the in-line device, that the core of the ERV or HRV system is clogged based on the data indicative of the first flow rate and the data indicative of the second flow rate.

33. The method of claim 29, further comprising:
wirelessly receiving, by the in-line device, data from a remote sensor for detecting an air quality in the external environment; and
operating, by the in-line device, the ERV or HRV system in response to detecting the air quality.

* * * * *

UNITED STATES PATENT AND TRADEMARK OFFICE
CERTIFICATE OF CORRECTION

| | | |
|---|---|---|
| PATENT NO. | : 11,604,005 B1 | Page 1 of 1 |
| APPLICATION NO. | : 17/685707 | |
| DATED | : March 14, 2023 | |
| INVENTOR(S) | : Jason Wolfson | |

It is certified that error appears in the above-identified patent and that said Letters Patent is hereby corrected as shown below:

On the Title Page

Column 1, Line 1, Item (71) delete "Tuckemuck" and insert -- Tuckernuck --.

Signed and Sealed this
Twenty-fifth Day of April, 2023

Katherine Kelly Vidal
*Director of the United States Patent and Trademark Office*